United States Patent
Harfmann

[19]

[11] Patent Number: 6,063,316
[45] Date of Patent: *May 16, 2000

[54] METHOD FOR PRODUCING POLYMER FOAM USING A BLOWING AGENT COMBINATION

[75] Inventor: Walter R. Harfmann, Matthews, N.C.

[73] Assignee: Genpak, L.L.C., Glens Falls, N.Y.

[ * ] Notice: This patent is subject to a terminal disclaimer.

[21] Appl. No.: 09/081,458

[22] Filed: May 19, 1998

Related U.S. Application Data

[63] Continuation-in-part of application No. 08/840,501, Apr. 21, 1997, abandoned, which is a continuation of application No. 08/682,889, Jul. 11, 1996, Pat. No. 5,679,295.

[51] Int. Cl.⁷ .................................................. B29C 44/20
[52] U.S. Cl. ........................... 264/50; 264/53; 264/DIG. 5
[58] Field of Search ........................... 264/50, 53, DIG. 5

[56] References Cited

U.S. PATENT DOCUMENTS

| | | | |
|---|---|---|---|
| 3,277,221 | 10/1966 | Parrish | 264/53 |
| 3,584,090 | 6/1971 | Parrish | 264/45 |
| 3,637,458 | 1/1972 | Parrish | 161/160 |
| 4,043,950 | 8/1977 | Wilmsen et al. | 260/2.5 F |
| 4,122,047 | 10/1978 | Filip et al. | 521/106 |
| 4,163,037 | 7/1979 | Niznik | 264/54 |
| 4,444,832 | 4/1984 | Mazzola et al. | 428/290 |
| 4,462,947 | 7/1984 | Huggard | 264/54 |
| 4,833,174 | 5/1989 | Tung | 521/81 |
| 4,981,631 | 1/1991 | Cheung et al. | 264/50 |
| 5,000,991 | 3/1991 | Hayashi et al. | 428/36.5 |
| 5,110,844 | 5/1992 | Hayashi et al. | 521/182 |
| 5,128,202 | 7/1992 | Subramanian et al. | 428/318.6 |
| 5,128,383 | 7/1992 | Amano et al. | 521/182 |
| 5,164,479 | 11/1992 | Funaki et al. | 264/176.1 |
| 5,223,545 | 6/1993 | Kumar | 521/51 |
| 5,229,432 | 7/1993 | Muschiatti | 521/182 |
| 5,234,640 | 8/1993 | Amano et al. | 264/55 |
| 5,246,976 | 9/1993 | Pontiff | 521/143 |
| 5,254,400 | 10/1993 | Bonner, Jr. et al. | 428/305.5 |
| 5,314,925 | 5/1994 | Burnell et al. | 521/91 |
| 5,340,846 | 8/1994 | Rotter et al. | 521/182 |
| 5,360,829 | 11/1994 | Kawabe et al. | 521/81 |
| 5,362,763 | 11/1994 | Al Ghatta et al. | 521/79 |
| 5,391,582 | 2/1995 | Muschiatti et al. | 521/81 |
| 5,399,595 | 3/1995 | Sublett et al. | 521/182 |
| 5,422,381 | 6/1995 | Al Ghatta et al. | 521/182 |
| 5,458,832 | 10/1995 | Kabumoto et al. | 264/53 |
| 5,679,295 | 10/1997 | Harfmann | 264/50 |
| 5,741,837 | 4/1998 | Wu et al. | 524/87 |
| 5,851,617 | 12/1998 | Keiser | 428/41.8 |

*Primary Examiner*—Allan R. Kuhns
*Attorney, Agent, or Firm*—Heslin & Rothenberg, P.C.; Wayne F. Reinke

[57] ABSTRACT

Low-density, high service temperature polymer foam is extruded by heating a crystalline polymer resin above its crystalline melt point to melt the resin, selecting a blowing agent combination, combining the blowing agent combination with the resin to create a mixture, cooling the mixture to a temperature approaching a freezing temperature for the mixture, and extruding the foam through a die. The blowing agent combination is made up of 50 to less than 100 mole percent of a first blowing agent having a boiling temperature at STP of greater than 310° K, and more than 0 to 50 mole percent of a second blowing agent having a boiling temperature at STP of less than 310° K. The blowing agent combination has an equilibrium solubility vapor pressure in the polymer of less than 45 atm at the foaming temperature and greater than or equal to 1 atm at the glass transition temperature.

2 Claims, 5 Drawing Sheets

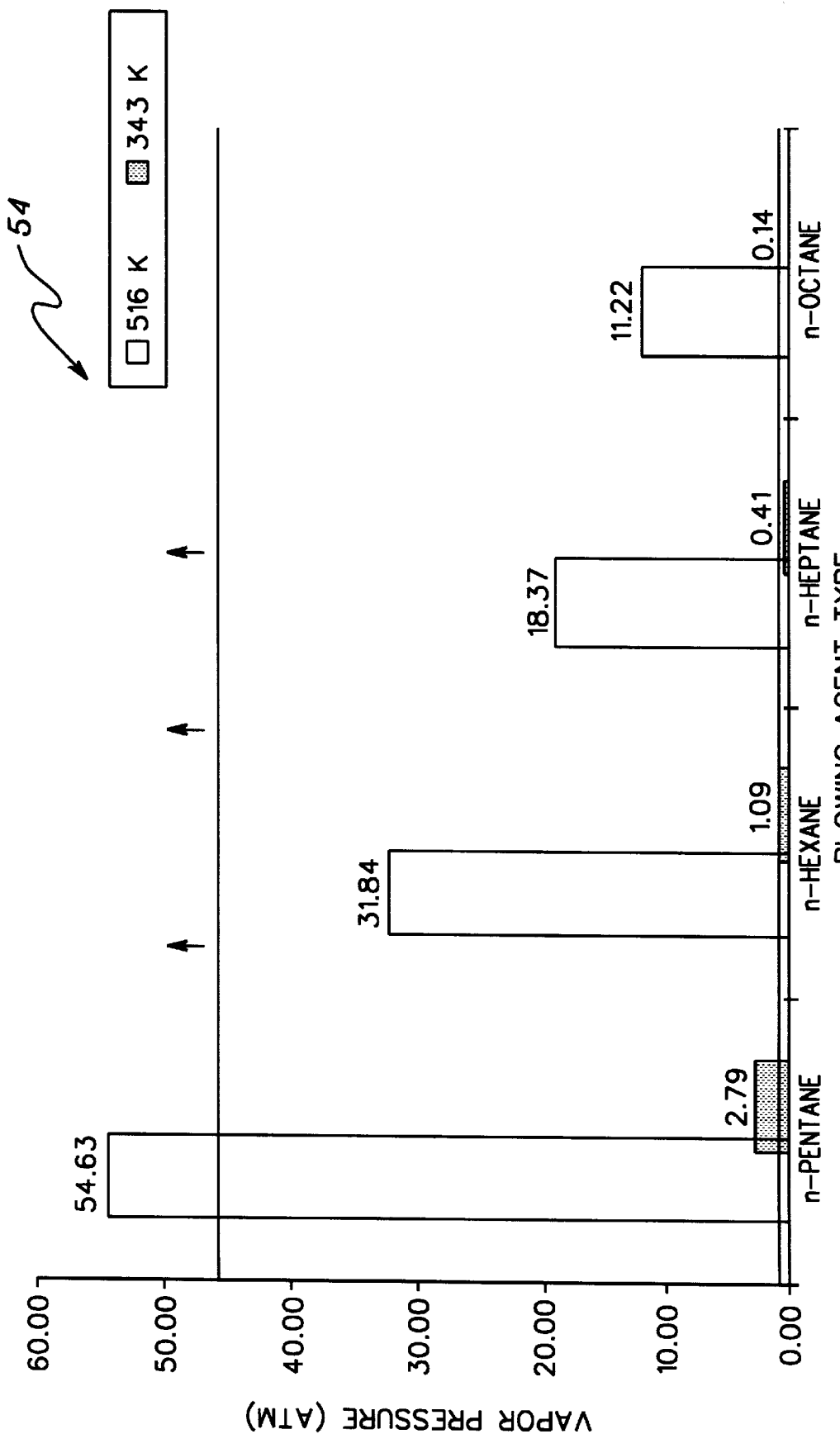

METHOD FOR PRODUCING POLYMER FOAM USING A BLOWING AGENT COMBINATION

This application is a continuation-in-part of U.S. patent application Ser. No. 08/840,501 filed Apr. 21, 1997 now abandoned, which is a continuation of U.S. patent application Ser. No. 08/682,889 filed Jul. 11, 1996, now U.S. Pat. No. 5,679,295, both of which are incorporated herein by reference.

BACKGROUND OF THE INVENTION

1. Technical Field

The present invention generally relates to a method for producing polymer foam by extrusion. More particularly, the present invention relates to a method for producing low-density, high melting point polymer foam by extrusion.

2. Background Information

For some time, low-density polystyrene foam (also referred to as "atactic" polystyrene foam) has been found useful in insulation, packaging, beverage cups and food containers. However, polystyrene foam generally has a service temperature limit of about 366.3° K. Above the service temperature limit, items made from the foam will warp and distort. Therefore, there is a general desire for other types of low-density foam that do not suffer such shortcomings.

Polymer resins, such as, for example, poly(ethylene terephthalate) (often referred to as "PET") and syndiotactic polystyrene, exist that could be used without such shortcomings. PET is currently widely used to make many recyclable plastic items, such as soda bottles. However, attempts to produce low-density foam from polymers with "high" melting points (i.e., greater than 505° K) has proven to be difficult, and the quality of such foam has been poor. Polymer foams extruded using single traditional blowing agents, such as, for example, carbon dioxide, chloro-difloro-methane and butane, have experienced foam cell collapse and/or severe corrugation. Thus, the quality of the foams produced has not been close to polystyrene. The problem of collapse is due to the high foaming temperature such materials demand, for example, PET foams at about 516° K. Using conventional blowing agents at such temperatures results in a high rate of expansion, causing cell wall rupture and allowing the gas to escape. Without gas in the foam cells prior to cooling, the cells cannot support themselves. In addition, many such polymer resins are crystalline in nature, and as such, have an inferior melt strength compared to polystyrene resins. As one skilled in the art will know, melt strength refers to the ability of a material to be stretched at its melting temperature without breaking. The combination of a lower melt strength and higher vapor pressure at the foaming temperature also requires a reduction in the size of the extrusion die opening where the foam exits. Such small die openings lead to a thin gauge foam sheet experiencing severe corrugation at low densities.

Thus, a need exists for a way to make a quality low-density, high service temperature polymer foam approaching or achieving the quality of polystyrene foam.

SUMMARY OF THE INVENTION

Briefly, the present invention satisfies the need for a quality low-density, high service temperature polymer foam by combining a high boiling point blowing agent providing plastization and volume with a low boiling point blowing agent providing the vapor pressure needed to prevent foam cell collapse during cooling.

In accordance with the above, it is an object of the present invention to provide a method for producing polymer foam by extrusion.

It is another object of the present invention to provide a method for producing low-density polymer foam.

It is still another object of the present invention to provide a method for producing low-density, high service temperature, substantially uniform closed cell polymer foam.

It is yet another object of the present invention to provide a method for producing low-density, high service temperature, substantially uniform closed cell polymer foam with a surface that is substantially smooth to the touch.

The present invention provides a method for producing a substantially uniform closed cell foam of density less than 0.25 g/cm$^3$ from a crystalline polymer resin by extrusion through a die at a foaming temperature. The method comprises steps of heating the crystalline polymer resin to a foaming temperature (for example, above 543° K for polyester) to melt it, selecting a blowing agent combination, combining the blowing agent combination with the resin to create a mixture, cooling the mixture to a temperature approaching a freezing temperature for the mixture (but not below the freezing temperature), and extruding the foam from the die. The blowing agent combination comprises 50 to less than 100 mole percent of a first blowing agent having a boiling temperature at STP of greater than 310° K, and more than 0 to 50 mole percent of a second blowing agent having a boiling temperature at STP of less than 310° K. The blowing agent combination has an equilibrium solubility pressure in the resin of less than about 45 atm at the foaming temperature, and greater than or equal to 1 atm at a glass transition temperature.

These, and other objects, features and advantages of this invention will become apparent from the following detailed description of the various aspects of the invention taken in conjunction with the accompanying drawings.

BRIEF DESCRIPTION OF THE DRAWINGS

FIG. 6 is similar to FIG. 5, but at typical polyester foaming temperatures.

BEST MODE FOR CARRYING OUT THE INVENTION

Figure 1:
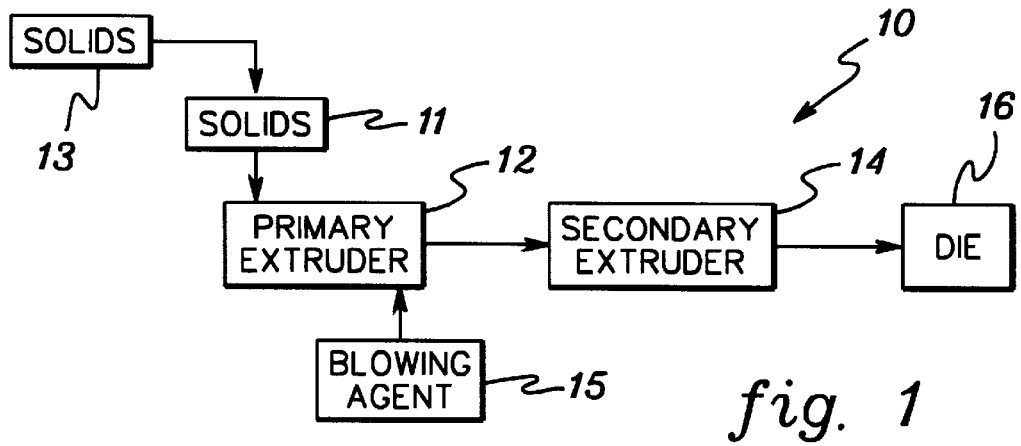
FIG. 1 is a block diagram of the major components of an extrusion system useful with the present invention.
Figure 2:
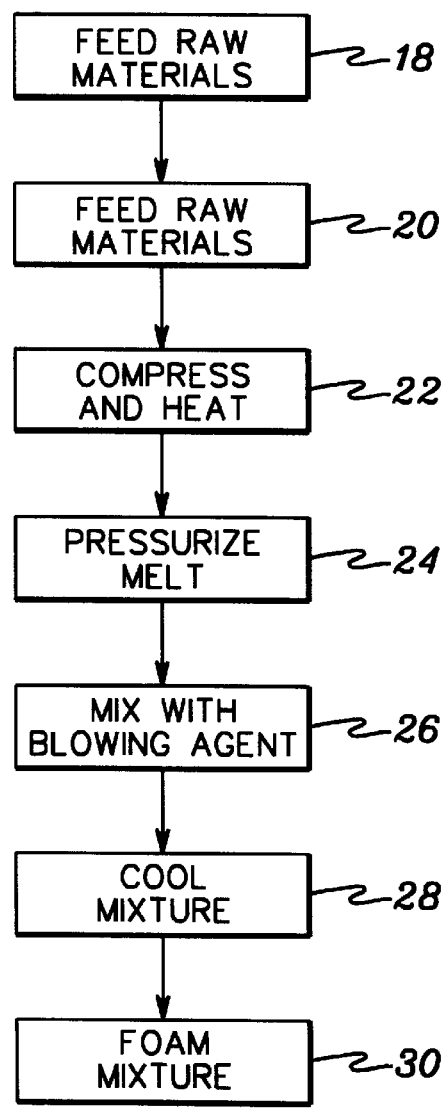
FIG. 2 is a flow diagram for a general extrusion process with reference to the system of FIG. 1.
Figure 3:
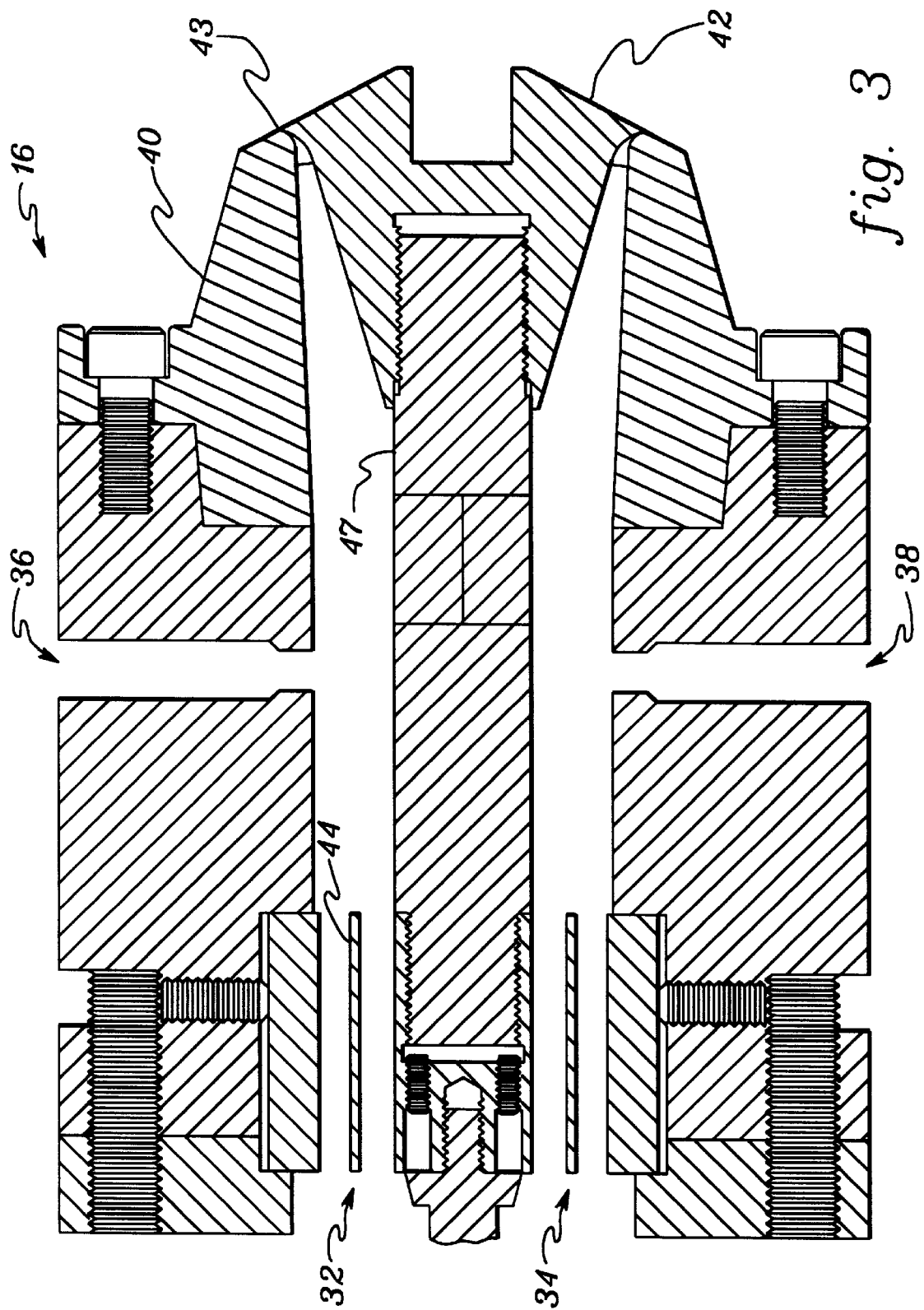
FIG. 3 is a cross-sectional view of the extrusion die of FIG. 1.

With reference to FIGS. 1–3 a general tandem extrusion process will now be described that is useful with the present invention. It will be understood, however, that other extrusion processes exist that could also be used, and this is merely one example given in order to put the invention in context.

FIG. 1 is a block diagram of the major portions 10 of machinery used in a tandem extrusion process. The major portions 10 include a desiccant dryer, a primary extruder 12, secondary extruder 14 and die 16. One of ordinary skill in the art will understand the operation of the major portions. Polyesters, for example, are hydroscopic and must be dried as they undergo severe degradation in the melt phase in the presence of water. For example, PET must be dried to a dew point of 233° K or less. The first step is therefore, for polyesters and similar hydroscopic polymers, to dry the raw materials using the desiccant dryer 11. Other materials, such as, for example, syndiotactic polystyrene, are not hydroscopic and do not need to be dried. Generally, heating of the solids 13 to be extruded (a polymer) and mixing with the blowing agent 15 are accomplished in primary extruder 12. Cooling of the mixture is performed in secondary extruder 14. Finally, the cooled mixture is fed to die 16 for foaming.

FIG. 2 is a flow diagram for the extrusion process of FIG. 1. The raw materials, if hydroscopic, are first dried (Step 18, "DRY RAW MATERIALS"). The raw materials are then fed to primary extruder 12 (STEP 20, "FEED RAW MATERIALS"). The raw materials will generally comprise a mixture of virgin polymer, reclaim polymer generated in manufacturing, colorants, stabilizers, nucleators, flame retardants, plactisizers, and possibly other additives. For crystalline polymers, the additives may additionally include, for example, a crystallinity nucleation agent. Although ratios of the additives may vary greatly, generally the virgin polymer and reclaim polymer constitute about 90% or more of the solid feed by weight. The raw materials may be fed to primary extruder 12 by volumetric or gravimetric feeders and may or may not use a blender to homogenize the mixture before being fed. Often, the primary extruder is flood fed; that is, there is a constant supply of raw material directly on the extruder inlet or feed throat, although other types of feeding are practiced.

After the raw materials are fed to primary extruder 12, they are compressed and heated to melt them (STEP 22, "COMPRESS AND HEAT"). After melting the raw materials, the melt is pressurized (STEP 24, "PRESSURIZE MELT"). Typical pressures range from about 150 atm to about 350 atm. After pressurizing the melt, a blowing agent or agents (e.g., hydrocarbons, halohydrocarbons and/or inert gases) is injected into primary extruder 12. The pressure may temporarily be reduced to aid in the injection. The melted raw materials and blowing agent are then mixed to create a homogeneous mixture prior to exiting primary extruder 12 (STEP 26, "MIX WITH BLOWING AGENT"). The mixing could be, for example, distributive or dispersive, whichever method best suits the blowing agent selected.

After injecting the blowing agent and combining with the melted raw materials, the mixture is generally too hot to foam. When the mixture is too hot, viscosity is low, and if foaming were attempted, the blowing agent would expand the cells within the foam too rapidly, leading to cell wall rupture and foam collapse. If, on the other hand, the mixture were too cold, the blowing agent would have insufficient potential energy to expand the mixture into a foam. In addition, there is a process danger that the mixture may freeze within the process, which is especially possible with crystalline polymers. Precise control of the foaming temperature is thus needed to ensure good quality foam.

Cooling of the mixture is accomplished in secondary extruder 14 (STEP 28, "COOL MIXTURE"). The secondary extruder is usually larger than the primary extruder to maximize the amount of surface area for heat transfer. Shear heating of the mixture is minimized through various designs for the secondary extruder screw, which provides continuous surface renewal. Without this renewal, the mixture at the surface of the extruder barrel would freeze and insulate the rest of the mass, which would pass through the secondary extruder without being cooled. Usually, the extruder barrel in the secondary extruder operates at a much lower rotational speed than that of the primary extruder, to reduce shear heating. The particular screw design used may affect the pressure of the mixture.

The cooled mixture is then delivered to die 16 for foaming (STEP 30, "FOAM MIXTURE"). The principle purpose of the die is to shape the polymer into a form, while maintaining the pressure to ensure that the blowing agent does not separate from the mixture prematurely. Ideally, the blowing agent remains in the mixture until exiting the die. The design of the die determines the shape/thickness of the extruded foam. After the foam is extruded, any number of finishing equipment technologies may be used to produce the final product.

Figure 4:
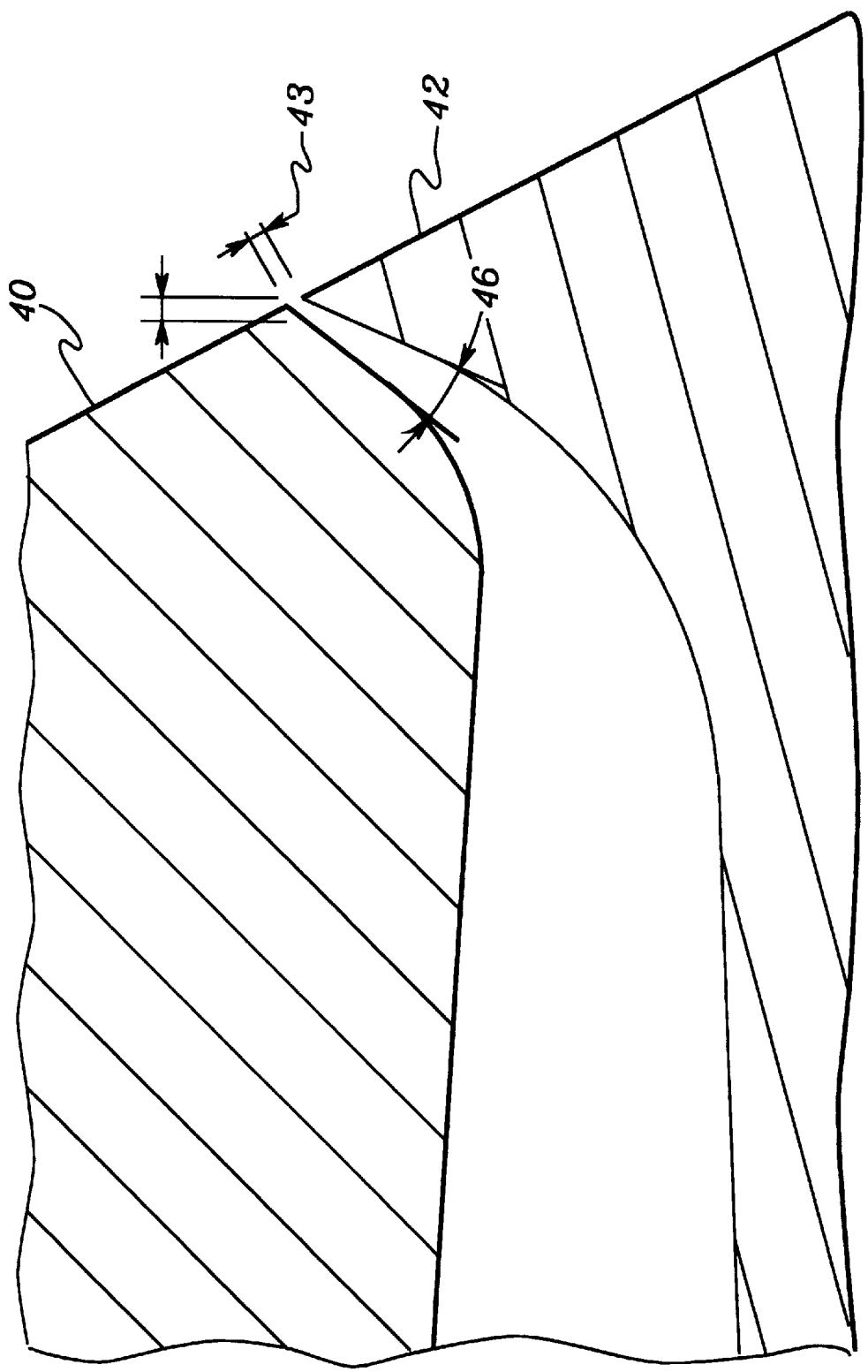
FIG. 4 depicts a blown-up portion of the die of FIG. 3.

FIG. 3 is a cross-sectional view of an exemplary embodiment of die 16. The cooled mixture enters die 16 through openings 32 and 34. The temperature and pressure of the mixture while inside the body of die 16 are monitored by instrumentation (not shown) connected at taps 36 and 38. The female die lip 40 and male die lip 42 define a die gap 43 (shown more clearly in FIG. 4). Spider or breaker plate section 44 holds male die lip 42 in place. Ideally, foaming takes place upon the polymer mixture exiting through die gap 40 and the blowing agent then vaporizing. However, foaming may begin in the land area 46 (called "prefoaming"). When prefoaming occurs, the result often is a less desirable surface finish and an irregular cell structure. To affect die pressure, the die gap may be increased or decreased through various mechanism. One example of such a mechanism is screw 47 in FIG. 3.

Producing good quality polystyrene foam by thermal extrusion requires that the blowing agent used remain in solution with the polystyrene resin upon entering the die land. As used herein, the term "good quality foam" refers to a substantially uniform closed cell foam with a surface that is substantially smooth to the touch. If the blowing agent comes out of solution prior to entering the land, pre-foaming occurs, resulting in a poor surface, nonuniform cells and a weak foam. Acceptable quality polystyrene foam is produced if the blowing agent comes out of solution after entering the land. However, good quality foam is produced if the blowing agent remains in solution until exiting the land. When this condition is satisfied, a clear "halo" of polystyrene can seen external to the die before foam growth has caused the material to become opaque. An operator of the extrusion machinery can use this halo as a visual indication that the die pressure is adequate and a good quality foam is most probably being produced.

The following variable relationships have been found useful in determining the conditions necessary to produce good quality polystyrene foam for a given blowing agent:

$$P_D \alpha \frac{R*BAC*TM}{GAP*DR} \text{ and} \quad (1)$$

$$P_D > P_{ES} \quad (2)$$

where $\alpha$ means "proportional to", * means "multiplied by", $P_D$ is the actual pressure at the die in atmospheres, R is the foam production rate in kg/hour, BAC is the blowing agent concentration expressed as a percentage of total solution weight, TM is the foaming temperature in ° C., GAP is the die gap in mm, DR is the die radius in cm, and $P_{ES}$ is blowing agent equilibrium solubility pressure in psi. Typically, $P_D$ is greater than $P_{ES}$ by about 20 to 40 atm to produce good quality foam. Additional pressure may improve the surface quality and foam cell structure, but at the cost of reducing throughput. Although the viscosity of the polymer resin and type of additives (e.g., talc to improve nucleation) also affect die pressure, variables other than those in relationships (1) and (2) above are assumed to be fixed by product requirement (e.g., the need for a flame retardant), or can be compensated for. As an example, temperature can be varied to compensate for viscosity.

Several additional assumptions greatly simplify relationship (1) above. The production rate is generally maximized for a given production line. The die radius is determined by the desired blow-up ratio (i.e., the ratio of the circumference of the die to the final width of the extruded foam sheet). Generally, this ratio will result in the smallest die diameter that will still allow the extruded foam to be easily handled without an undue amount of corrugation. As one skilled in the art will know, the term "corrugation" describes foam extruded with alternating thick and thin areas, where the surface of the foam sheet can be characterized by a sine wave relationship. Finally, the lowest achievable melt temperature is generally used for a given production rate. Thus, based on a given production geometry, these variables become "fixed".

Based on these additional assumptions, relationship (1) reduces to:

$$P_D \alpha \frac{BAC}{GAP}. \quad (3)$$

The GAP varies, depending on the desired sheet thickness. Generally, a GAP of less than about 0.4 mm is undesirable, as dirt is more likely to inhibit extrusion and a foam thickness of greater than 10 times the GAP is generally difficult to achieve. Thus, 0.4 mm will be treated as the practical minimum die GAP. In addition, the BAC is determined by the desired density, as described more fully below. Therefore, for practical purposes, no degrees of freedom remain for a given blowing agent, and the blowing agent selected will either fall within a practical operating window for relationship (3) or it will not. Such a window 52 is shown in graph 50 of FIG. 5 for polystyrene at 373° K and 411° K for a typical density of 0.1 g/cm³.

Figure 5:
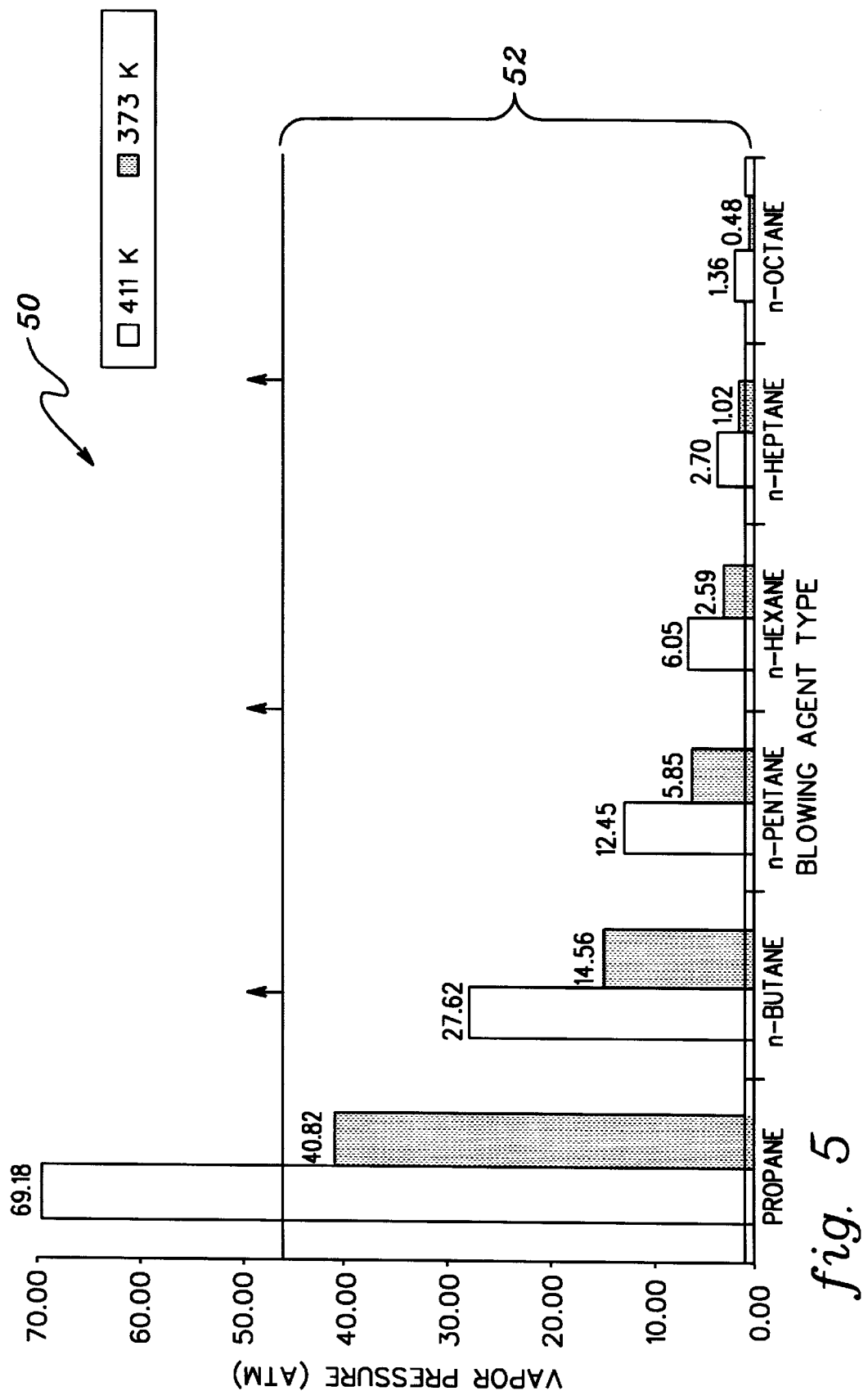
FIG. 5 is a graph of vapor pressure versus blowing agent type for typical polystyrene foaming temperatures.

Materials that meet the above parameters for use as a blowing agent for polystyrene include butanes, pentanes and hexanes. Although other materials also exist that could be used as blowing agents according to the above requirements, notably hydro-halocarbons, only alkanes will be discussed here to illustrate the point. As can be seen in FIG. 5, vapor pressures above approximately 45 atmospheres result in corrugation of the product yielding irregular strength and inferior appearance. Propane is expected to and does in fact result in product corrugation. A small amount of corrugation (about 10% thickness variation or less) is seen when using n-Butane. However, this corrugation can be "formed out" of the product during thermoforming operations. Pressures corresponding to this slight amount of corrugation range form 25 to 45 atmospheres. At the other end of graph 50 are blowing agents that will not support the density of the product as the polystyrene mass cools and "freezes" at its glass transition temperature of approximately 373° K. As the internal cell gas pressure of n-Octane is less than 1 atmosphere at the glass transition temperature, collapse will occur. This is also true of n-Heptane to a degree, since equilibrium vapor pressure is somewhat less than ideal vapor pressure. (Some amount of the blowing agent is in solution with the polymer, thereby lowering the overall vapor pressure.) Theory and experiment agree as some amount of collapse is seen with n-Heptane. It can therefore be seen that n-Pentane represents a near prefect blowing agent for polystyrene using conventional foaming technology. No corrugation is expected and no collapse of the product is expected as the product cools. This is in fact what is seen in the real world, and n-Pentane is widely used as a blowing agent.

In the recent past, some polymer manufacturers have dedicated substantial resources to producing modified resins with melt strengths approaching that of polystyrene. Thus, it is a reasonable starting point to assume that relationships (1) and (2) above for polystyrene foam blowing agents will also hold true for blowing agents used with such modified polymers, such as, for example, PET and syndiotactic polystyrene. The following discussion will focus on PET, however, it will be understood that it is applicable to other high melting point polymers.

As with polystyrene, the PET foam production rate is determined by the extrusion equipment used, power requirements, etc. Also, the blowing agent concentration is again set according to the desired density, and the die gap is set according to the desired PET foam thickness. The die blow-up ratio for PET foam is similar to, but slightly smaller than that for polystyrene, since PET foam has proven difficult to handle at blow-up ratios of over three-to-one. As one skilled in the art will know, the "blow-up ratio" refers to the circumference of the mandrel determining the final width of the sheet compared to the circumference of the die. Polystyrene foam is generally produced at up to a four-to-one blow-up ratio at typical commercial densities. Finally, the melt temperature for PET is significantly different than that for polystyrene. Polystyrene is foamed at about 411° K, whereas PET is foamed at about 516° K. At this higher temperature, traditional blowing agents will cause severe corrugation and/or cell collapse, due to their increased vapor pressure.

Corrugation results when the growth rate of the foam exceeds the physical geometric constraints of the system. For a given product, it is desired to obtain a given density and thickness. The density is controlled through the moles of gas added and the thickness is controlled through the pull or take-away speed. When producing foam, bubble formation initiates a three-dimensional growth. Since thickness is controlled and machine direction speed is limited by rate, the only remaining dimension for growth is radial. In the manufacture of foam sheet, as indicated above, a blow-up ratio of 3 to 4 is typical. The sheet exits the die with a finite velocity and transitions from the die diameter to the mandrel diameter at a maximum angle of 90 degrees (45 to 70 degrees is common). If the rate of bubble growth increases the sheet circumference more quickly than the blow-up geometry allows, corrugation will occur. Corrugation can be described as a sine wave pattern during growth about a circular centerline. The result of this corrugation is that permanent lines are produced in the sheet in the machine direction corresponding to areas that are relatively thicker and thinner next to each other. The thinner areas when formed into a final product yield weak bands in the product. The result is poor product strength, heavier part weight to offset the poor strength, and poor appearance.

There are three major factors that determine corrugation: density, volatility of the blowing agent, and cell size. As the desired density decreases, the expansion ratio (density of the polymer melt divided by the density of the final foam) increases. Generally, product thickness requirements are set and the resulting increase in volumetric growth must be accommodated in the machine and radial directions. If the foam is to retain a relatively balanced cell structure, both must be increased by a power of 1.73 (i.e., the square root of 3). That is, since:

expansion ratio=k×(radial growth)×(thickness growth)×(machine direction growth), where k is a constant, if the expansion ratio is increased, but thickness is fixed, the equation becomes:

expansion ratio=k×(radial growth)$^{1.73}$ ×(machine direction growth)$^{1.73}$.

The exponents can be manipulated somewhat to attempt to reduce the radial growth, but it can be clearly seen that a reduction in density results in a higher radial growth rate, and, therefore, a greater possibility of corrugation.

The volatility of the blowing agent affects corrugation in that increased volatility results in more rapid cell growth. This often means that the final density of the product is reached or nearly reached before the product achieves the diameter of the mandrel, and, therefore, corrugation results. Low volatility blowing agents result in slow bubble growth and, therefore, no corrugation, but these gases may not contain the necessary potential energy to expand the foam to the desired density or may even become liquid during the expansion process, resulting in product collapse.

The cell size affects corrugation in the following way. The bubble growth rate is determined by the ability of the blowing agent to permeate to a nearby cell site and become gaseous. If more nucleant is used and the cells are smaller, the mean distance for the blowing agent to permeate to a cell is reduced. The result is faster cell growth and, again, a greater possibility of corrugation. It is theorized that as the cell size approaches zero and the number of cells approaches infinity, the growth rate of the foam approaches infinity, and the product will corrugate with any geometry.

Blowing agent combinations, according to the present invention, reduce corrugation. No selection of gases can affect the desired blow-up ratio; that is, the blow-up ratio is an independent variable. Cell size is also a controlled variable chosen for reasons of product strength, flexibility, or appearance. The proper blend of blowing agents can, however, reduce the overall volatility of the system. The higher volatility component will expand first. Since the lower volatility component contributes little to bubble growth in this early phase, the effect is that the relative expansion ratio is low, and, therefore, the opportunity for corrugation is greatly reduced. The lower volatility blowing agent then contributes a slower bubble growth, achieving the desired density without corrugation. During this phase, the partial pressure of the higher volatility blowing agent in the cells helps to prevent collapse of the foam structure.

As used herein, corrugation expressed as a percentage refers to the percentage difference between the maximum sheet thickness and minimum sheet thickness in adjoining bands or strips. In other words, it is the percent deviation about a local mean thickness. A level of up to 10% in corrugation can usually be tolerated, as the forming operation often will ultimately still yield a fairly uniform product.

Since variables for PET other than melt temperature are similar to that for polystyrene, the blowing agents useful for PET should be those that exhibit vapor pressures at the PET foaming temperature similar to that exhibited by the traditional blowing agents at the polystyrene foaming temperature. Based on this simple premise, merely shifting the practical operating area in graph 50 of FIG. 5 to the right should result in blowing agent choices providing good quality PET foam. FIG. 6 graphs n-Pentane through n-Octane, similar to FIG. 5, at temperatures of 516° K and 343° K (the melt temperature at the die and glass transition temperature for PET, respectively) for a typical density of 0.1 g/cm$^3$. Note that the vapor pressures used to construct the graphs of FIGS. 5 and 6 were estimated using Antoine Equations as presented in *The Properties of Gases & Liquids*, 3d Ed., by Reid, Penusnitz and Sherwood, McGraw Hill, 1977, p. 629–665, which is hereby incorporated by reference.

Examination of FIG. 6 reveals, however, that simply shifting the graph toward higher molecular weight blowing agents is ineffective. Unlike polystyrene, there is a large temperature difference between the foaming temperature, which must be above the crystalline melt temperature, and the glass transition temperature. (To form product, the extruded sheet is quenched using a chilled roll or mandrel. This results in an amorphous sheet, but also allows for molecular movement down to the glass transition temperature of about 343° K.) Graph 54 suggests that n-Pentane will cause excessive corrugation, while some collapse of the foam will occur when using n-Heptane. Both of these suggestions have been experimentally verified. From FIG. 6, it can be seen that n-Hexane satisfies the selection criteria previously discussed. Although through careful control of operating parameters, n-Hexane can be used successfully to produce low-density PET foam, its toxicity makes it unsuitable for many commercial uses.

To consistently produce "good quality" PET foam, it is clear that few, if any, single blowing agents can be used. However, by blending two or more blowing agents, the desired characteristics can be obtained. For example, a two-parts n-Octane to one-part n-Pentane would have the following properties. Rault's Gas Law provides that partial pressures are additive, therefore:

pressure (at foaming)=(0.67×11.22 atm)+(0.33×54.63 atm)=25.5 atm, thus meeting the desired maximum vapor pressure needed to eliminate or nearly eliminate corrugation. (As stated before, a small amount of corrugation can be compensated for in the forming operation.) To prevent collapse:

pressure (at glass transition temperature)=(0.67×0.14 atm)+(0.33×2.79 atm)=1.01 atm, thus meeting the desired minimum vapor pressure needed to prevent collapse. Clearly then, there are many possible combinations of two or more blowing agents that will yield good quality foam.

The present invention provides a method for extruding good quality, low-density, high melting point polymer foam. The term "low-density" used in this context refers to an extruded polymer foam of a density less than about 0.25 g/cm$^3$. A crystalline polymer resin is first heated to the foaming temperature, which depends on the resin used, but is above its crystalline melt point (about 543° K for polyester). A combination of blowing agents is then selected for combining with the polymer resin.

The blowing agent combination comprises about 50 to less than 100 mole percent of a first blowing agent having a boiling temperature at STP (Standard Temperature and Pressure) of greater than 310° K. Examples of blowing agents that could be used as the first blowing agent include heptane, octane and cyclopentane. The first blowing agent, having a relatively high boiling temperature, provides plastization and volume for the foam. The blowing agent combination also comprises more than 0 to about 50 mole percent of a second blowing agent having a boiling temperature at STP of less than 310° K. Examples of blowing agents that could be used as the second blowing agent include butane, tetrafloroethane, carbon dioxide, i-pentane and n-pentane. The second blowing agent, having a relatively low boiling temperature, provides the vapor pressure to prevent collapse at the glass transition temperature. In addition, high vapor pressure represents potential energy that, upon exiting the die, is converted to work used to expand the foam against the visco-elastic resistance of the polymer. This high vapor pressure component is useful in achieving low densities. The blowing agent combination has an equilibrium solubility vapor pressure in the relevant polymer resin of less than 45 atm at the foaming temperature and greater than or equal to 1 atm at the glass transition temperature.

After the blowing agent combination is selected, it is combined with the polymer resin to create a mixture. The mixture is then cooled to a temperature approaching the freezing temperature of the polymer-blowing agent mixture, but not going below the freezing temperature, to maximize polymer melt strength during the actual foaming of the mixture. The blowing agents can act as a plastisizer, depressing the melting point of the polymer. This temperature is therefore dependent on both the polymer and blowing agents selected, and can be predicted using Flory-Huggins equations or determined experimentally. Typically, the term "approaching" used above will refer to a temperature within about 10° K of the freezing point of the mixture. However, since not all polymers display the same viscoelastic properties with respect to temperature, this temperature range may vary somewhat. For PET, a temperature of less than about 538° K, and preferably less than 528° K, depending on the blowing agents used, is required. The cooled mixture is then extruded through the die. For good quality foam, the blowing agent combination should stay in solution with the resin until at least until entering the die land, and preferably until exiting the die land.

Example data will now be presented with respect to polyester and syndiotactic polystyrene, as examples of two types of polymers the invention is useful with. Similar results are expected for other high melting point crystalline polymers, such as, for example, Nylon 6,6. Examples 1–6 use the same polyester resin. However, examples 1–4 use a single blowing agent, while examples 5 and 6 use a combination of different blowing agents. Examples 7 and 8 use syndiotactic polystyrene resin, and example 7 uses a single blowing agent, while example 8 uses a blowing agent combination. In addition, typical nucleators are used in each example.

EXAMPLE 1

This example (see Table I below) illustrates one of the two major problems associated with conventional blowing agents. At a level of 1% iso-pentane, which yields a relatively high density of 0.23 g/cm³, unacceptable levels of corrugation were produced. Compared to the average thickness of 1.08 mm, the thickness of the sheet at the high and low points varied plus and minus 20%. This variation in thickness or corrugation caused weak bands to be formed into the product and resulted in an unacceptable product quality. (Although somewhat arbitrary, corrugation levels of up to 10% are generally considered acceptable. The forming operation can successfully remove such a level of corrugation without deleterious effects to the final product.) Note that at this density, the efficiency of the blowing agent is quite high. The measured foam density was 96% of the theoretical density attainable, based on the mass of material extruded and the amount of blowing agent added.

The theoretical density was calculated based on the ideal gas law. The mass of the solid additives was converted to a volume based upon specific gravity. This amount of volume was added to the gaseous volume and divided into the extruded mass to yield a density. To determine the gaseous volume, the ideal gas law was used. The blowing agent weight added was converted to moles. By the ideal gas law, each mole yields 22.4 liters of volume at 1 atm and 298° K. The gas in the expanding mass can be assumed to expand until internal and external pressures reach equilibrium. The polyester only expands until reaching the glass transition temperature of about 343° K, at which time the foam became "frozen" and no further movement of the polyester molecules occurred. Using the elevated temperature of 343° K, a further reduction of 15% in the density is attainable due to the additional expansion of a gaseous mole to 25.8 liters. Again, this volume is based on the ideal gas law. Assumptions in this model include: the ideal gas law is applicable (this is a good assumption as pressures were low and the gases were not critical), and the residual solubility of the blowing agent in the polymer at the glass transition temperature is small (based on temperature and pressure solubility data, this is also considered a valid assumption).

TABLE I

| Temperatures | |
| --- | --- |
| 2.5" Cooling Extruder | 527° K. |
| Die Temperature | 540° K. |
| Die Lip | 526° K. |
| Crossover Melt | 555° K. |
| Die Melt | 527° K. |
| Pressures | |
| Injection Pressure | 183.7 atm |
| 2" Pressure | 233.3 atm |
| Crossover Pressure | 191.2 atm |
| Die Pressure | 41.5 atm |
| Drive Conditions | |
| 2" AMP | 34 amps |
| 2" Speed | 70 rpm |
| 2.5" AMP | 14 amps |
| 2.5" Speed | 16.5 rpm |
| Formulations | |
| Polymer Type | Shell TRAYTUF 10485 |
| Polymer Rate | 29.2 kg/hr |
| Nucleator Type | Shell 10480 |
| Nucleator Rate | 0.36 kg/hr |
| Blowing Agent Type | i-Pentane |
| Blowing Agent Rate | 0.30 kg/hr |
| Test Data | |
| Density | 0.23 g/cm³ |
| Theoretical Density | 0.22 g/cm³ |
| Average Thickness | 1.08 mm |
| Corrugation | 20% |
| Cell Size | 0.18 mm |

EXAMPLE 2

This example (see Table II below) illustrates the problem of collapse associated with conventional blowing agents used in an effort to make polyester foam. In this case, the amount of gas was increased to a level yielding a theoretical density of 0.11 g/cm³. Due to the high vapor pressure of the gas at the foaming temperature, the growth rate of the foam exceeded the melt strength of the polymer. The result was open cell foam and complete collapse.

TABLE II

| Temperatures | |
|---|---|
| 2.5" Cooling Extruder | 525° K. |
| Die Temperature | 531° K. |
| Die Lip | 532° K. |
| Crossover Melt | 549° K. |
| Die Melt | 525° K. |
| Pressures | |
| Injection Pressure | 170.1 atm |
| 2" Pressure | 195.9 atm |
| Crossover Pressure | 174.2 atm |
| Die Pressure | 48.3 atm |
| Drive Conditions | |
| 2" AMP | 35 amps |
| 2" Speed | 80 rpm |
| 2.5" AMP | 10 amps |
| 2.5" Speed | 17.0 rpm |
| Formulation | |
| Polymer Type | Shell TRAYTUF 10485 |
| Polymer Rate | 33.4 kg/hr |
| Nucleator Type | Shell 10480 |
| Nucleator Rate | 0.24 kg/hr |
| Blowing Agent Type | i-Pentane |
| Blowing Agent Rate | 0.76 kg/hr |
| Test Data | |
| Density | >1.0 g/cm$^3$ |
| Theoretical Density | 0.11 g/cm$^3$ |
| Average Thickness | NA |
| Corrugation | NA |
| Cell Size | NA |

EXAMPLE 3

This example (see Table III below) illustrates the problem associated with high boiling point gases that have insufficient vapor pressure at the polyester glass transition temperature to support the foam structure. In this example, a level of 1.4% n-Heptane was used as the blowing agent yielding on a mole basis the same theoretical density as Example 1. The actual measured density is, however, 0.29 g/cm$^3$, which results in a blowing agent efficiency of only 76% versus 96% in Example 1. Since the vapor pressure of n-Heptane is insufficient to keep the cell fully expanded as the foam cools, some level of collapse was observed, which accounts for the low blowing agent efficiency. Note that the level of corrugation measured was less than 10%.

TABLE III

| Temperatures | |
|---|---|
| 2.5" Cooling Extruder | 527° K. |
| Die Temperature | 536° K. |
| Die Lip | 530° K. |
| Crossover Melt | 555° K. |
| Die Melt | 527° K. |
| Pressures | |
| Injection Pressure | 190.5 atm |
| 2" Pressure | 240.8 atm |
| Crossover Pressure | 195.2 atm |
| Die Pressure | 59.9 atm |
| Drive Conditions | |
| 2" AMP | 36 amps |
| 2" Speed | 70 rpm |

TABLE III-continued

| | |
|---|---|
| 2.5" AMP | 14 amps |
| 2.5" Speed | 18.5 rpm |
| Formulation | |
| Polymer Type | Shell TRAYTUF 10485 |
| Polymer Rate | 29.2 kg/hr |
| Nucleator Type | Shell 10480 |
| Nucleator Rate | 0.36 kg/hr |
| Blowing Agent Type | n-Heptane |
| Blowing Agent Rate | 0.42 kg/hr |
| Test Data | |
| Density | 0.29 g/cm$^3$ |
| Theoretical Density | 0.22 g/cm$^3$ |
| Average Thickness | 0.97 mm |
| Corrugation | 6% |
| Cell Size | 0.17 mm |

EXAMPLE 4

In this example (see table IV below), the level of n-Heptane was increased to 1.8% in an effort to produce a sample with a density of less than 0.25 g/cm$^3$. The theoretically attainable density for this sample is 0.18 g/cm$^3$. The result of increasing the gas level was, however, to produce a higher density product than Example 3. The density of the product at some point during cooling did approach the theoretical value, however, that resulted in thinner cell walls that were even less capable of resisting cell collapse than Example 3. The sheet produced had a density of 0.37 g/cm$^3$ and a blowing agent efficiency of only 49%. Note that although the level of corrugation expected was relatively low, the actual measured value of 15% was believed to be due to preferential collapse along lines of otherwise minor levels of corrugation.

TABLE IV

| Temperatures | |
|---|---|
| 2.5" Cooling Extruder | 528° K. |
| Die Temperature | 540° K. |
| Die Lip | 532° K. |
| Crossover Melt | 555° K. |
| Die Melt | 528° K. |
| Pressures | |
| Injection Pressure | 163.3 atm |
| 2" Pressure | 231.3 atm |
| Crossover Pressure | 163.3 atm |
| Die Pressure | 53.7 atm |
| Drive Conditions | |
| 2" AMP | 35 amps |
| 2" Speed | 70 rpm |
| 2.5" AMP | 14 amps |
| 2.5" Speed | 20.5 rpm |
| Formulation | |
| Polymer Type | Shell TRAYTUF 10485 |
| Polymer Rate | 28.8 kg/hr |
| Nucleator Type | Shell 10480 |
| Nucleator Rate | 0.72 kg/hr |
| Blowing Agent Type | n-Heptane |
| Blowing Agent Rate | 0.54 kg/hr |
| Test Data | |
| Density | 0.37 g/cm$^3$ |
| Theoretical Density | 0.18 g/cm$^3$ |

TABLE IV-continued

| | |
|---|---|
| Average Thickness | 0.83 mm |
| Corrugation | 15% |
| Cell Size | 0.13 mm |

EXAMPLE 5

This example (see Table V below) illustrates the present invention. The blowing agent used is a blend of 55% by weight n-Heptane with 45% by weight iso-pentane. Both of these blowing agents have been shown by example to produce inferior product by themselves. Combined in this ratio, the calculated vapor pressure of the blend (which is by Roult's law additive) was 36 atm at 516° K and 1.80 atm at 343° K, satisfying the conditions for selection as a successful blowing agent combination. The resulting example supports the selection criteria. The sample produced had a density of 0.23 g/cm³, a blowing agent efficiency of 84%, and corrugation of only 3%.

TABLE V

| | |
|---|---|
| Temperatures | |
| 2.5" Cooling Extruder | 527° K. |
| Die Temperature | 542° K. |
| Die Lip | 531° K. |
| Crossover Melt | 556° K. |
| Die Melt | 527° K. |
| Pressures | |
| Injection Pressure | 217.7 atm |
| 2" Pressure | 212.9 atm |
| Crossover Pressure | 217.0 atm |
| Die Pressure | 83.7 atm |
| Drive Conditions | |
| 2" AMP | 34 amps |
| 2" Speed | 85 rpm |
| 2.5" AMP | 12 amps |
| 2.5" Speed | 17.5 rpm |
| Formulation | |
| Polymer Type | Shell TRAYTUF 10485 |
| Polymer Rate | 33.4 kg/hr |
| Nucleator Type | Shell 10480 |
| Nucleator Rate | 0.24 kg/hr |
| Blowing Agent Type | Blend 1* |
| Blowing Agent Rate | 0.54 kg/hr |
| Test Data | |
| Density | 0.23 g/cm³ |
| Theoretical Density | 0.18 g/cm³ |
| Average Thickness | 0.99 mm |
| Corrugation | 3% |
| Cell Size | 0.20 mm |

*55% n-Heptane/ 45% i-Pentane by weight

EXAMPLE 6

This example (see Table VI below) further illustrates the present invention. The blowing agent used is a blend of 70% by weight c-Pentane with 30% by weight iso-Pentane. When combined in this ratio, a density of 0.19 g/cm³ was achieved resulting in a blowing agent efficiency of 100% (within experimental error). The measured level of corrugation for this sample was 5%.

TABLE VI

| | |
|---|---|
| Temperatures | |
| 2.5" Cooling Extruder | 525° K. |
| Die Temperature | 541° K. |
| Die Lip | 534° K. |
| Crossover Melt | 550° K. |
| Die Melt | 525° K. |
| Pressures | |
| Injection Pressure | 210.9 atm |
| 2" Pressure | 212.9 atm |
| Crossover Pressure | 215.0 atm |
| Die Pressure | 59.2 atm |
| Drive Conditions | |
| 2" AMP | 35 amps |
| 2" Speed | 80 rpm |
| 2.5" AMP | 16 amps |
| 2.5" Speed | 18.0 rpm |
| Formulation | |
| Polymer Type | Shell TRAYTUF 10485 |
| Polymer Rate | 36.0 kg/hr |
| Nucleator Type | Shell 10480 |
| Nucleator Rate | 0.36 kg/hr |
| Blowing Agent Type | Blend 2* |
| Blowing Agent Rate | 0.42 kg/hr |
| Test Data | |
| Density | 0.19 g/cm³ |
| Theoretical Density | 0.19 g/cm³ |
| Average Thickness | 1.22 mm |
| Corrugation | 5% |
| Cell Size | 0.22 mm |

*30% i-Pentane/ 70% c-Pentane by weight

EXAMPLE 7

In this example, syndiotactic polystyrene was extruded using a conventional blowing agent, iso-pentane. It was expected that at the required foaming temperature, severe corrugation or cell wall rupture and consequent foam collapse would be witnessed. The data (Table VII below) support this expectation. Using the ideal gas law and a glass transition temperature of 373° K, a theoretical density of 0.072 g/cm³ was calculated. The actual measured density was 0.37 g/cm³, indicating a great deal of collapse. Additionally, the product severely corrugated immediately on exiting the die and an 18% level of corrugation was measured, despite the high density of the sample. It can therefore be seen, that this sample made using syndiotactic polystyrene supports the expected observations made using previously recorded data for polyester.

TABLE VII

| | |
|---|---|
| Temperatures | |
| 2.5" Cooling Extruder | 500° K. |
| Die Temperature | 541° K. |
| Die Lip | 544° K. |
| Crossover Melt | 565° K. |
| Die Melt | 541° K. |
| Pressures | |
| Injection Pressure | 149.7 atm |
| 2" Pressure | 28.6 atm |
| Gear Pump Inlet Pressure | 86.4 atm |
| Gear Pump Exit Pressure | 119.7 atm |
| Die Pressure | 46.3 atm |

TABLE VII-continued

| Drive Conditions | |
|---|---|
| 2" AMP | 24 amps |
| 2" Speed | 84 rpm |
| Gear Pump AMP | 2.2 amps |
| Gear Pump Speed | 25.0 rpm |
| 2.5" AMP | 8 amps |
| 2.5" Speed | 15.1 rpm |
| Formulation | |
| Polymer Type | Dow QUESTRA 72104.02L |
| Polymer Rate | 18.2 kg/hr |
| Nucleator Type | 40% Talc Conc. in PS |
| Nucleator Rate | 0.45 kg/hr |
| Blowing Agent Type | iso-pentane |
| Blowing Agent Rate | 0.55 kg/hr |
| Test Data | |
| Density | 0.37 g/cm$^3$ |
| Theoretical Density | 0.07 g/cm$^3$ |
| Average Thickness | 1.10 mm |
| Corrugation | 18% |
| Cell Size | 0.20 mm |

EXAMPLE 8

This example (see Table VIII below) illustrates the utility of the present invention with other high temperature crystalline polymers. In this example, syndiotactic polystyrene foam was produced by the method of this invention using a blowing agent blend of 50% n-Heptane and 50% iso-pentane, by weight.

In this example, a density of 0.20 g/cm$^3$ was achieved with a corrugation level of 10%. It can be clearly seen that this sample is a significant improvement over Example 7, which was made via conventional blowing agent technology.

TABLE VIII

| Temperatures | |
|---|---|
| 2.5" Cooling Extruder | 497° K. |
| Die Temperature | 541° K. |
| Die Lip | 545° K. |
| Crossover Melt | 567° K. |
| Die Melt | 542° K. |
| Pressures | |
| Injection Pressure | 149.7 atm |
| 2" Pressure | 32.7 atm |
| Gear Pump Inlet Pressure | 85.7 atm |
| Gear Pump Exit Pressure | 127.2 atm |
| Die Pressure | 34.7 atm |
| Drive Conditions | |
| 2" AMP | 24 amps |
| 2" Speed | 73 rpm |
| Gear Pump AMP | 2.1 amps |
| Gear Pump Speed | 25.0 rpm |
| 2.5" AMP | 8 amps |
| 2.5" Speed | 15.2 rpm |

TABLE VIII-continued

| Formulation | |
|---|---|
| Polymer Type | Dow QUESTRA 72104.02L |
| Polymer Rate | 18.2 kg/hr |
| Nucleator Type | 40% Talc Conc. in PS |
| Nucleator Rate | 0.45 kg/hr |
| Blowing Agent Type | Blend 3* |
| Blowing Agent Rate | 0.50 kg/hr |
| Test Data | |
| Density | 0.20 g/cm$^3$ |
| Theoretical Density | 0.11 g/cm$^3$ |
| Average Thickness | 1.55 mm |
| Corrugation | 10% |
| Cell Size | 0.30 mm |

*50% iso-Pentane/50% n-Heptane by weight

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method for producing a substantially uniform closed cell foam of density less than 0.25 g/cm$^3$ from a crystalline polymer resin by extrusion through a die at a foaming temperature, comprising steps of:

heating the crystalline polymer resin to the foaming temperature such that the resin melts;

selecting a blowing agent combination, comprising: 50 to less than 100 mole percent of a first blowing agent having a boiling temperature at STP of greater than 310° K; and more than 0 to 50 mole percent of a second blowing agent having a boiling temperature at STP of less than 310° K; wherein the blowing agent combination has an equilibrium solubility pressure in the resin of less than about 45 atmospheres (atm) at the foaming temperature and greater than or equal to 1 atm at a glass transition temperature;

combining the blowing agent combination with the resin to create a mixture;

cooling the mixture to a temperature approaching a freezing temperature for the mixture; and extruding the substantially uniform closed cell foam of density less than 0.25 g/cm$^3$ from the die;

wherein the crystalline polymer resin comprises syndiotactic polystyrene resin.

2. The method of claim 1, wherein the first blowing agent comprises heptane, octane or cyclopentane, and wherein the second blowing agent comprises butane, tetrafloroethane, carbon dioxide, i-pentane or n-pentane.

* * * * *